(12) United States Patent
Zhang et al.

(10) Patent No.: US 11,492,296 B1
(45) Date of Patent: Nov. 8, 2022

(54) CARBONIZATION-BASED LIGHTWEIGHT CO2 FOAMED CEMENT-BASED MATERIAL, AND OPTIMIZED PREPARATION METHOD AND USE THEREOF

(71) Applicant: HOHAI UNIVERSITY, Jiangsu (CN)

(72) Inventors: Jian Zhang, Jiangsu (CN); Tugen Feng, Jiangsu (CN); Shanwei Zhang, Jiangsu (CN); Jiaxin Jin, Jiangsu (CN)

(73) Assignee: HOHAI UNIVERSITY, Jiangsu (CN)

( * ) Notice: Subject to any disclaimer, the term of this patent is extended or adjusted under 35 U.S.C. 154(b) by 0 days.

(21) Appl. No.: 17/717,152

(22) Filed: Apr. 11, 2022

(30) Foreign Application Priority Data

Jun. 4, 2021 (CN) .......................... 202110622785.6

(51) Int. Cl.

| | | |
|---|---|---|
| *C04B 38/10* | (2006.01) | |
| *C04B 24/10* | (2006.01) | |
| *C04B 24/20* | (2006.01) | |
| *C04B 28/02* | (2006.01) | |
| *B01F 23/235* | (2022.01) | |
| *B28C 7/04* | (2006.01) | |
| *B01F 101/28* | (2022.01) | |
| *C04B 103/48* | (2006.01) | |
| *C04B 103/42* | (2006.01) | |
| *C04B 111/40* | (2006.01) | |

(52) U.S. Cl.
CPC .......... *C04B 38/103* (2013.01); *B01F 23/235* (2022.01); *B28C 7/04* (2013.01); *C04B 24/10* (2013.01); *C04B 24/20* (2013.01); *C04B 28/02* (2013.01); *B01F 2101/28* (2022.01); *C04B 2103/42* (2013.01); *C04B 2103/48* (2013.01); *C04B 2111/40* (2013.01)

(58) Field of Classification Search
CPC ......... C04B 24/10; C04B 24/20; C04B 28/02; C04B 38/103; C04B 2103/42; C04B 2103/48; C04B 2111/40; B01F 23/235; B01F 2101/28; B28C 7/04
See application file for complete search history.

(56) References Cited

FOREIGN PATENT DOCUMENTS

| CN | 105198484 A | * | 12/2015 |
|---|---|---|---|
| CN | 111943607 A | * | 11/2020 |
| CN | 112010619 A | * | 12/2020 |
| CN | 112679185 A | * | 4/2021 |

* cited by examiner

Primary Examiner — Anthony J Green
(74) Attorney, Agent, or Firm — JCIPRNET

(57) ABSTRACT

The present invention discloses an optimized preparation method of a carbonization-based lightweight $CO_2$ foamed cement-based material, and belongs to the field of geotechnical engineering materials. The preparation method includes: step S1: pre-screening existing common cement-based foaming agents and foam stabilizers; step S2: preparing a water-based carbon dioxide foam; step S3: preparing a cement slurry, and mixing the water-based carbon dioxide foam with the cement slurry to prepare a lightweight $CO_2$ foamed cement-based material; step S4: selecting foaming agents of different types and different concentrations and foam stabilizers of different types and different concentrations to prepare slurries, subjecting the slurries to slurry performance tests, and selecting the optimal ones; step S5: optimizing initial water-to-cement ratio and foam-to-slurry ratio parameters; and step S6: optimizing a gas-filling volume parameter (water pump speed).

8 Claims, 4 Drawing Sheets

CARBONIZATION-BASED LIGHTWEIGHT CO2 FOAMED CEMENT-BASED MATERIAL, AND OPTIMIZED PREPARATION METHOD AND USE THEREOF

CROSS-REFERENCE TO RELATED APPLICATION

This application claims the priority benefit of China application serial no. 202110622785.6, filed on Jun. 4, 2021. The entirety of the above-mentioned patent application is hereby incorporated by reference herein and made a part of this specification.

TECHNICAL FIELD

The present invention relates to a carbonization-based lightweight $CO_2$ foamed cement-based material, and an optimized preparation method and use thereof, and belongs to the fields of geotechnical engineering materials.

BACKGROUND

In the process of accelerating urbanization construction, the rapid development of construction industry inevitably increases carbon dioxide emissions, which leads to a series of problems such as sea level rise and global warming. In addition, due to fuel combustion and clinker calcination, a large amount of carbon dioxide will be generated in cement production. According to statistics of the Information Research Center of China Cement Association: 0.9 to 1.2 tons of carbon dioxide will be produced during the calcination of every ton of quicklime; a carbon dioxide emission in a cement production cycle accounts for about 25% of a total emission; and a total cement production in China last year exceeded 2.3 billion tons. Therefore, in the 21st century, countries have begun to pay attention to carbon dioxide emission reduction, capture and storage, and dissipation technologies. However, the existing carbon dioxide curing requires a high cost and is difficult to implement on site. How to efficiently and reasonably utilize carbonation to achieve the goal of carbon neutrality by 2060 is an important issue in geotechnical engineering today.

SUMMARY

In view of the above-mentioned problems in the prior art, the present invention provides an optimized preparation method of a carbonization-based lightweight $CO_2$ foamed cement-based material based on a carbonation principle of cement slurry in combination with the existing foamed cement slurry preparation technology to solve problems such as high curing cost and difficult implementation.

In addition, the present invention provides a carbonization-based lightweight $CO_2$ foamed cement-based material, which makes up for the low strength of lightweight cement slurry.

In addition, the present invention provides use of the carbonization-based lightweight $CO_2$ foamed cement-based material in synchronous grouting, roadbed-filling, silt solidification, and soil improvement.

The present invention adopts the following technical solutions:

A carbonization-based lightweight $CO_2$ foamed cement-based material is provided, including the following components: a teasaponin foaming agent with a concentration of 4 g/L, a sodium dodecylbenzenesulfonate (SDBS) foam stabilizer with a concentration of 5 g/L, a water-based carbon dioxide foam, and a cement slurry, where a foam-to-slurry volume ratio of the water-based carbon dioxide foam to the cement slurry is 4.5:1; a water-to-cement mass ratio of the cement slurry is 1:2.4;

and a speed of a water pump to produce the water-based carbon dioxide foam is 70 r/s.

An optimized preparation method of a carbonization-based lightweight $CO_2$ foamed cement-based material is provided, including the following steps:

step S1: investigating existing foaming agents and foam stabilizers for lightweight cement slurries, and selecting $n_1$ foaming agents and $n_1$ foam stabilizers that are commonly used;

step S2: using a water-based carbon dioxide foam foaming machine to conduct a pre-experiment on the $n_1$ foaming agents and the $n_1$ foam stabilizers in step S1, and selecting $n_2$ foaming agents and $n_2$ foam stabilizers according to a water-based foam stabilization time and a foaming height to prepare water-based carbon dioxide foams, where $n_2 < n_1$;

step S3: preparing a cement slurry with a predetermined initial water-to-cement ratio, and mixing a water-based carbon dioxide foam with the cement slurry in a predetermined foam-to-slurry ratio to prepare a lightweight $CO_2$ foamed cement slurry;

step S4: conducting experimental design based on the $n_2$ foaming agents and the $n_2$ foam stabilizers in step S2: using foaming agents of different types and different concentrations and foam stabilizers of different types and different concentrations to prepare lightweight $CO_2$ foamed cement slurries according to step S3, and subjecting the prepared slurries to slurry performance tests, where slurry performance includes a specific gravity, a flowability, a consistency, a water excretion rate, a concretion volume shrinkage, a concretion density, and 7 d and 28 d uniaxial compressive strengths (UCSs); and optimizing the type and concentration of foaming agent and the type and concentration of foam stabilizer according to slurry performance requirements, where the optimization process is conducted by an orthogonal experiment: setting a concentration range of conventional foaming agents as $[w_1\text{-}w_2]$, evenly dividing the concentration range to obtain $n_2$ parameter points $w_1$, $A_1$, $A_2 \ldots A_{n2\text{-}2}$, and $w_2$; setting a concentration range of foam stabilizers as $[w_3\text{-}w_4]$, evenly dividing the concentration range to obtain $n_2$ parameter points $w_3$, $B_1$, $B_2 \ldots B_{n2\text{-}2}$, and $w_4$; and in conjunction with the $n_2$ foaming agents and the $n_2$ foam stabilizers selected in step S2, conducting a four-factor $n_2$ level orthogonal experiment on the foaming agent type and concentration and the foam stabilizer type and concentration, and using range analysis to obtain an optimization result of the experiment, where a calculation method includes:

selecting the following four performance indexes of slurry for analysis: 7-d compressive strength, density, concretion rate, and foam stabilization time;

assuming that A, B . . . represent different factors; r represents a number of levels of each factor; $A_i$ represents an ith level of factor A, where i=1, 2 . . . r; and $X_{ij}$ represents a value of an ith level of factor j, where i=1, 2 . . . r and j=A, B . . . ; conducting n tests under $X_{ij}$ to obtain n test results, which are $Y_{ij}$, where calculation parameters are as follows:

$$K_{ij} = \sum_{k=1}^{n} Y_{ijk}$$

where $K_{ij}$ represents a statistical parameter of the factor j at the ith level; n represents a number of tests of the factor j at the ith level; $Y_{ij}$ represents an index value of the kth test result of the factor j at the ith level, where k=1, 2 . . . r;

$$R_j = \frac{\max\{K_{1j}, K_{2j}, \ldots K_{rj}\} - \min\{K_{1j}, K_{2j}, \ldots K_{rj}\}}{m}$$

where $R_j$ represents a range of the factor j and m represents a number of levels of an experimental factor;

based on comprehensive consideration of range results of the 7-d compressive strength, the density, the concretion rate, and the foam stabilization time of the slurries, determining the optimal foaming agent type and concentration and the optimal foam stabilizer type and concentration;

step S5: based on the optimal foaming agent type and concentration and the optimal foam stabilizer type and concentration in step S4, designing different initial water-to-cement ratios and foam-to-slurry ratios to prepare slurries, subjecting the slurries to slurry performance tests, optimizing the initial water-to-cement ratio and foam-to-slurry ratio parameters according to slurry performance requirements;

step S6: conducting different gas-filling volume tests on the slurries obtained in step S5, subjecting the slurries to slurry performance tests, optimizing an air-filling volume based on the slurry performance requirements.

Further, a carbonization process of $CO_2$ with the cement slurry is as follows:

$CO_2+H_2O \rightarrow H_2CO_3$ $Ca(OH)_2+H_2CO_3 \rightarrow CaCO_3$ $3CaO_2SiO_23H_2O+3H_2CO_3 \rightarrow 3CaCO_3+2SiO_2+6H_2O$ $2CaO\ SiO_24H_2O+2H_2CO_3 \rightarrow 2CaCO_3+SiO_2+6H_2O$.

Further, due to the fragile water-based carbon dioxide foam, the water-based carbon dioxide foam is mixed with the cement slurry by hand stirring in step S3.

Further, in consideration of a cost of controlling the gas-filling volume parameter, the gas-filling volume parameter in step S6 is replaced by a water pump speed.

Further, the water-based carbon dioxide foam foaming machine includes a carbon dioxide cylinder, a primary pressure-reducing valve, a secondary pressure-reducing valve, a gas storage pipe, a liquid storage pipe, a foaming pipe, a foaming liquid, a foam-discharging pipe, and a controller; the primary pressure-reducing valve is arranged on the carbon dioxide cylinder and is connected to the secondary pressure-reducing valve through the gas storage pipe; the secondary pressure-reducing valve is connected to one end of the foaming pipe, and the liquid storage pipe is connected to the other end of the foaming pipe; the foaming liquid is stored in the liquid storage pipe, the foam-discharging pipe extends from a bottom end of the foaming pipe; and a specific foaming process includes: preparing the foaming liquid in advance, and turning on the water pump to make the foaming liquid enter the foaming pipe from the liquid storage pipe; turning on a switch of the carbon dioxide cylinder, and adjusting the primary pressure-reducing valve connected to the carbon dioxide cylinder to make an output gas pressure not higher than 0.5 MPa; adjusting the secondary pressure-reducing valve in the foaming machine to accurately control a foaming pressure at no more than 0.02 MPa, such that carbon dioxide flows into the foaming pipe through the gas storage pipe and is mixed with the foaming liquid; and turning off the water pump, clicking a foaming button, and responding by the controller to make the foaming liquid flow from the foaming pipe into a foam blowing port through a restrictor, such that a prepared carbon dioxide foam flows out through a foam-discharging port.

Further, given that carbon dioxide is liable to form carbonic acid when it encounters water, which is corrosive, in order to improve the test stability, all pipes and devices inside the water-based carbon dioxide foam foaming machine are treated for corrosion resistance.

Further, in step S2, foaming liquids of the same volume are pre-prepared according to an experimental ratio for full foaming, and a volume of a water-based carbon dioxide foam formed after a premix is completely foamed is recorded as a foaming volume of a corresponding foaming liquid; a ratio of a foam volume to a premix volume is defined as a foaming ratio expressed by Au, and a larger Au indicates a stronger foaming ability of the foaming liquid; a time required when a foam volume is dissipated to half of an original volume is defined as a half-life period of a corresponding foaming agent, expressed by Tu; and a larger Tu indicates a better stability of the water-based foam.

Further, in step S5, a full experiment is adopted in the optimization process of initial water-to-cement ratio and foam-to-slurry ratio parameters: setting an initial water-to-cement ratio parameter range of the conventional cement slurry as $[w_5\text{-}w_6]$, and evenly dividing the initial water-to-cement ratio parameter range to obtain $n_3$ parameter points $w_5, C_1, C_2 \ldots C_{n3\text{-}2}$, and $w_6$; setting a foam-to-slurry ratio parameter range as $[w_7\text{-}w_8]$, and evenly dividing the foam-to-slurry ratio parameter range to obtain $n_4$ parameter points $w_7, D_1, D_2 \ldots D_{n4\text{-}2}$, and $w_8$; and conducting a full experiment on the initial water-to-cement ratios and foam-to-slurry ratios.

Further, the influence of different water-to-cement ratios on strength and density of a cement slurry is subjected to comprehensive analysis under the same foam-to-slurry ratio to obtain a balanced water-to-cement ratio, the density of the cement slurry is relatively low and the strength is relatively high; and a method includes: setting maximum and minimum reduction percentages of each of the density and the strength respectively as 0% and 100%, plotting two polylines according to the reduction percentages, and defining a water-to-cement ratio corresponding to an intersection point of the two polylines as the balanced initial water-to-cement ratio.

Further, in step S6, a contrast experiment is adopted in the gas-filling volume optimization process: setting a gas-filling volume parameter range of the conventional lightweight cement slurry as $[w_9\text{-}w_{10}]$, and evenly dividing the gas-filling volume parameter range to obtain $n_5$ parameter points $w_9, E_1, E_2 \ldots E_{n5\text{-}2}$, and $w_{10}$; and conducting a contrast experiment on the gas-filling volume, comparing specific gravity and compressive strength properties of the lightweight cement slurry under different gas-filling volumes, and selecting the optimal gas-filling volume parameter.

The present invention combines the carbonization technology and the lightweight cement slurry technology, and compared with existing materials, the material of the present invention has the following improvements and advantages:

1. In the present invention, a carbon dioxide gas is used instead of traditional air foaming to prepare a water-based carbon dioxide foam, and then the water-based carbon dioxide foam is mixed with a cement slurry according to predetermined initial water-to-cement ratio and foam-toslurry ratio parameters, which has the characteristics of low specific gravity and low consumable cost of lightweight cement slurry.

2. Compared with the traditional lightweight cement slurry, the acceleration of carbonization of a cement slurry through carbon dioxide bubbles in the present invention makes up for the low strength of the lightweight cement slurry.

3. Due to the corrosiveness of carbonic acid, all pipes and devices inside the foaming machine in the preparation step S2 of the present invention are treated for corrosion resistance. A carbon dioxide cylinder is used instead of the traditional air compressor, which provides an air pressure required for foaming and also supplies $CO_2$ required for the water-based foam preparation test. Due to a large difference between a cylinder pressure and a foaming pressure and the safety of the indoor test, a pressure-reducing valve is arranged at both the cylinder and the foaming machine to depressurize a plurality of times.

4. The density of the water-based carbon dioxide foam is related to the gas-filling volume and the water pump speed. The larger the gas-filling volume or the smaller the water pump speed, the more the carbon dioxide per unit volume of foam, and the larger the foam diameter. The higher the water pump speed or the smaller the gas-filling volume, the higher the water content in the foaming agent per unit time, and the smaller the foam diameter. The foaming machine in the preparation step S2 of the present invention controls the foam density by adjusting the water pump speed instead of the gas-filling volume parameter. Compared with the gas-filling volume, the water pump speed parameter is easier to control and leads to a more significant effect.

5. In the pre-experiment in the preparation step S1 of the present invention, based on the foam stability and foaming ratio parameters, common foaming agents and foam stabilizers are each effectively screened to reduce the number of late-stage optimization test groups of foaming agents and foam stabilizers.

6. In the present invention, the optimization of foaming agent and foam stabilizer is conducted through an orthogonal experiment and range analysis, which requires fewer test groups than a comprehensive experiment, and leads to scientific and accurate test results and an efficient optimization process through the influence degree of different performance range arrangements of foam grout.

7. Performance parameters of the lightweight $CO_2$ foamed cement slurry prepared by the present invention are as follows. The foamed cement slurry has a specific gravity of lower than 1.68 $g/cm_3$, a water separation rate of lower than 12%, a concretion rate of higher than 85%, a concretion density of lower than 1.68 $g/cm_3$, a flexural strength of higher than 2.0 MPa and a compressive strength of higher than 8.0 MPa after a 7-d curing period, and a flexural strength of higher than 4.0 MPa and a compressive strength of higher than 10.0 MPa after a 28-d curing period.

8. The $CO_2$ foamed cement slurry prepared by the present invention has high practical application potential, and can be applied to wall coatings, synchronous grouting of shields, roadbed-filling, silt solidification, soil improvement, and the like. The $CO_2$ foamed cement slurry obtained in the present invention is not limited to the above-mentioned applications, and applications of the lightweight $CO_2$ foamed cement slurry in the relevant fields of the present invention all belong to the application scope of the present invention.

BRIEF DESCRIPTION OF THE DRAWINGS

The present invention is described in further detail below with reference to the accompanying drawings and examples.

DETAILED DESCRIPTION OF THE EMBODIMENTS

The present invention will be described in detail below to clearly and completely illustrate the technical solutions in the examples of the present invention. Apparently, the described examples are merely a part rather than all of the examples of the present invention. All other examples obtained by a person of ordinary skill in the art based on the examples of the present invention without creative efforts shall fall within the protection scope of the present invention.

Example 1

Figure 1:
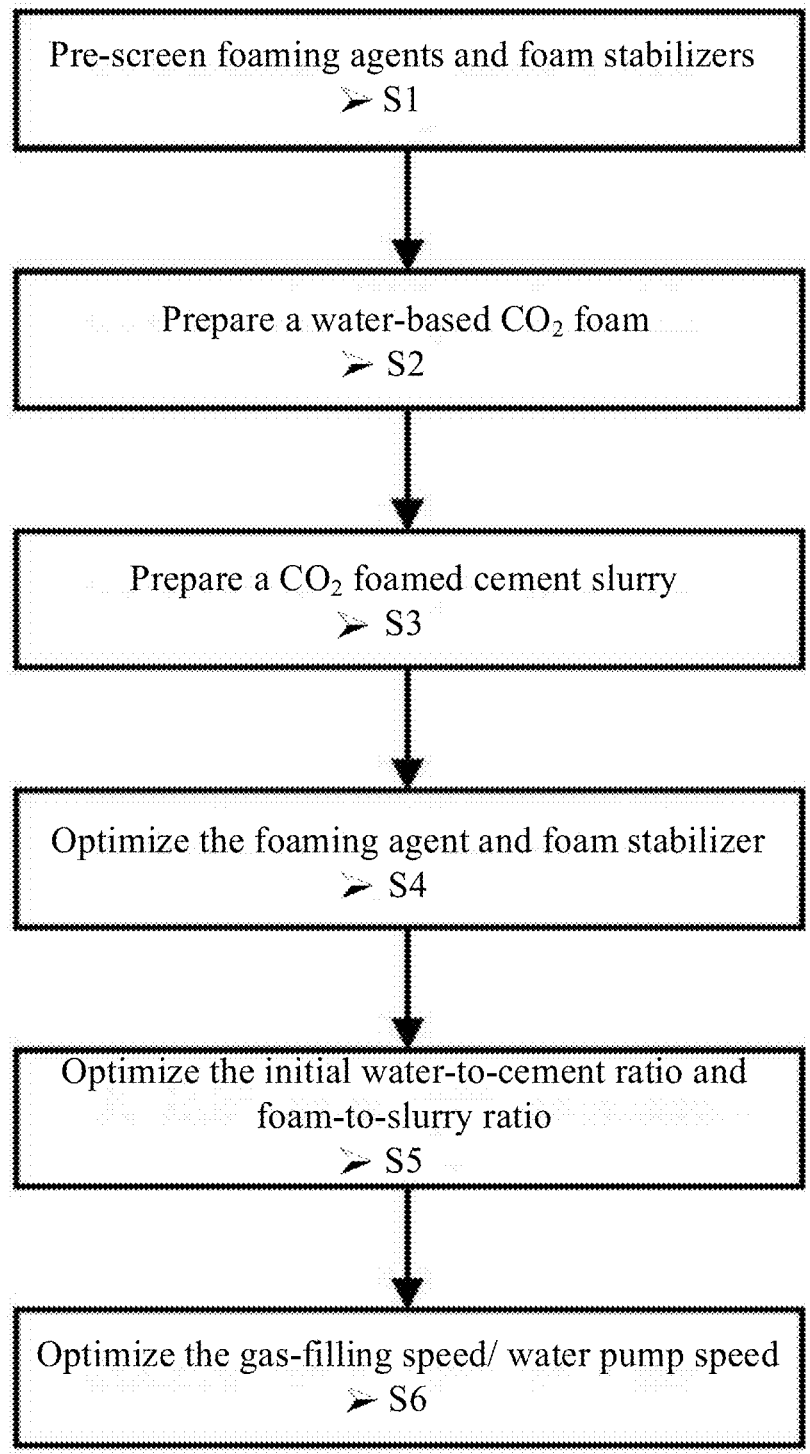
FIG. 1 is a preparation flow block diagram of the present invention.

An optimized preparation method of a carbonization-based lightweight $CO_2$ foamed cement-based material is provided in the present invention. The preparation method is shown in FIG. 1, including the following steps.

Step S1: Existing foaming agents and foam stabilizers for lightweight cement slurries are investigated, and 6 foaming agents and 6 foam stabilizers that are commonly used are selected.

Figure 2:
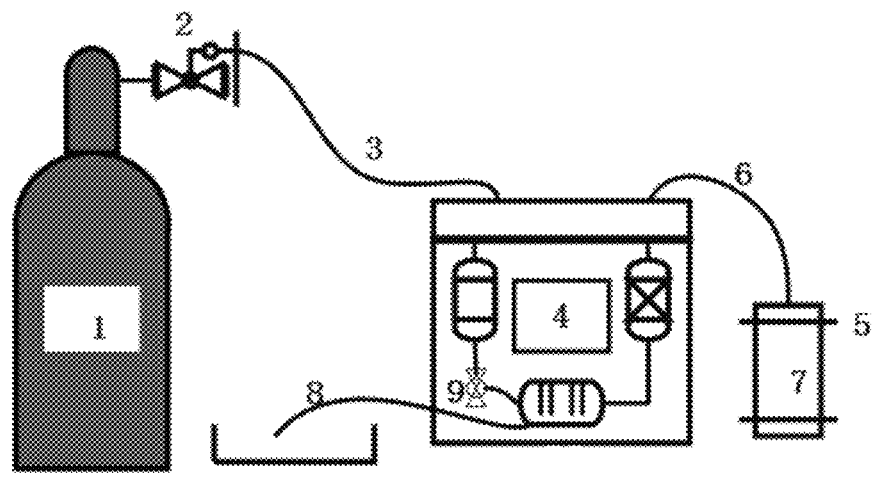
FIG. 2 is a schematic diagram of a water-based carbon dioxide foam foaming machine.

Step S2: A water-based carbon dioxide foam foaming machine shown in FIG. 2 is used to conduct a pre-experiment on the 6 foaming agents and the 6 foam stabilizers in step S1, and 3 foaming agents and 3 foam stabilizers are selected according to a water-based foam stabilization time and a foaming height to prepare water-based carbon dioxide foams. As shown in FIG. 2, the water-based carbon dioxide foam foaming machine includes a carbon dioxide cylinder 1, a primary pressure-reducing valve 2, a secondary pressure-reducing valve 9, a gas storage pipe 3, a liquid storage pipe 5, a foaming pipe 6, a foaming liquid 7, a foam-discharging pipe 8, and a controller 4. The primary pressure-reducing valve 2 is arranged on the carbon dioxide cylinder 1 and is connected to the secondary pressure-reducing valve 9 through the gas storage pipe 3. The secondary pressure-reducing valve 9 is connected to one end of the foaming pipe 6, and the liquid storage pipe 5 is connected to the other end of the foaming pipe 6. The foaming liquid 7 is stored in the liquid storage pipe 5, and the foam-discharging pipe 8 extends from a bottom end of the foaming pipe 6. The specific foaming process includes: preparing the foaming liquid 7 in advance, and turning on the water pump to make the foaming liquid 7 enter the foaming pipe 6 from the liquid storage pipe 5; turning on a switch of the carbon dioxide cylinder 1, and adjusting the primary pressure-reducing valve 2 connected to the carbon dioxide cylinder 1 to make an output gas pressure not higher than 0.5 MPa; adjusting the secondary pressure-reducing valve 9 in the foaming machine to accurately control a foaming pressure at no more than 0.02 MPa, such that carbon dioxide flows into the foaming pipe 6 through the gas storage pipe 3 and is mixed with the foaming liquid 7; and turning off the water pump, clicking a foaming button, and responding by the controller 4 to make the foaming liquid 7 flow from the foaming pipe 6 into a foam blowing port through a restrictor, such that a prepared carbon dioxide foam flows out through a foam-discharging port connected to the foam-discharging pipe 8.

Step S3: A cement slurry with a predetermined initial water-to-cement ratio (1:2.4) is prepared in the laboratory, and a water-based carbon dioxide foam is mixed with the cement slurry in a predetermined foam-to-slurry ratio (5:1) to prepare a lightweight $CO_2$ foamed cement slurry.

Step S4: An orthogonal experiment is designed based on the 3 foaming agents and 3 foam stabilizers in step S2, and the prepared slurries are subjected to slurry performance tests (specific gravity, flowability, consistency, water excretion rate, concretion volume shrinkage, concretion density, and 7 d and 28 d UCSs).

The following four performance indexes of slurry are selected for range analysis: 7-d compressive strength, density, concretion rate, and foam stabilization time. The reasons are as follows. a. The specific gravity of the $CO_2$ foamed cement slurry is approximately positively correlated with the density of the concretion, the larger the specific gravity of the slurry, the greater the concretion density. Given that the concretion density is very important for the performance of the slurry, the concretion density is adopted as a range analysis index. b. In the same period, the compressive strength is approximately positively correlated with the flexural strength, that is, the higher the flexural strength, the higher the compressive strength of the corresponding group. In combination with an engineering application, the compressive strength is adopted as an index of range analysis. c. With the increase of the curing period, the concretion strength increases. Therefore, compared with the 3-d strength, the 7-d strength is adopted as an index of the range analysis. d. The foam stabilization time is an index to measure the performance of the water-based foam, which directly affects the action time of carbonization; and thus the foam stabilization time is also adopted as an index for the range analysis.

It is assumed that A, B . . . represent different factors; r represents a number of levels of each factor; $A_i$ represents an ith level of factor A, where i=1, 2 . . . r; and $X_{ij}$ represents a value of an ith level of factor j (i=1, 2 . . . r and j=A, B . . . ). n tests are conducted under $X_{ij}$ to obtain n test results, which are $Y_{ij}$ (k=1, 2 . . . r), where calculation parameters are as follows:

$$K_{ij} = \sum_{k=1}^{n} Y_{ijk}$$

where $K_{ij}$ represents a statistical parameter of the factor j at the ith level; n represents a number of tests of the factor j at the ith level; $Y_{ij}$ represents an index value of the kth test result of the factor j at the ith level.

$$R_j = \frac{\max\{K_{1j}, K_{2j}, \ldots K_{rj}\} - \min\{K_{1j}, K_{2j}, \ldots K_{rj}\}}{m}$$

where $R_j$ represents a range of the factor j and m represents a number of levels of an experimental factor.

The experiment results show that the foam stabilization performance of the water-based foam and the density, concretion rate, and concretion strength of the foamed cement slurry are comprehensively considered; teasaponin with a concentration of 4 g/L is adopted as a foaming agent; and SDBS with a concentration of 5 g/L is adopted as a foam stabilizer.

Step S5: With teasaponin with a concentration of 4 g/L as a foaming agent and SDBS with a concentration of 5 g/L as a foam stabilizer, comprehensive experiments of different initial water-to-cement ratios (1:2.2, 1:2.4, 1:2.6, and 1:2.8) and foam-to-slurry ratios (3:1, 5:1, and 7:1) are designed, and the prepared slurries are subjected to slurry performance tests (specific gravity, flowability, consistency, water excretion rate, concretion volume shrinkage, concretion density, and 7 d and 28 d UCSs). The initial water-to-cement ratio and foam-to-slurry ratio parameters are optimized according to slurry performance requirements. The influence of different water-to-cement ratios (foam-to-slurry ratio) on strength and density of a cement slurry is subjected to comprehensive analysis under the same foam-to-slurry ratio (foam-to-slurry ratio) to obtain a balanced water-to-cement ratio (foam-to-slurry ratio) as shown in Table 1, that is, under the water-to-cement ratio (foam-to-slurry ratio), the density of the cement slurry is relatively low and the strength is relatively high. The engineering performance is excellent, and the cost can be controlled. A method is as follows. Maximum and minimum reduction percentages of each of the density and the strength are respectively set as 0% and 100%, two polylines are plotted according to the reduction percentages, and a water-to-cement ratio (foam-to-slurry ratio) corresponding to an intersection point of the two polylines is defined as the balanced initial water-to-cement ratio (foam-to-slurry ratio).

Table 1 Influence of different water-to-cement ratios/foam-to-slurry ratios on the density and strength of the cement slurry

| Water-to-cement ratio | Density change percentage | Strength change percentage | Foam-to-slurry ratio | Density change percentage | Strength change percentage |
| --- | --- | --- | --- | --- | --- |
| 1:2.2 | 100 | 0 | 1:3 | 100 | 0 |
| 1:2.4 | 50.21 | 62.71 | 1:5 | 3.3 | 42.74 |
| 1:2.6 | 38.81 | 88.24 | 1:7 | 0 | 100 |
| 1:2.8 | 0 | 100 | | | |

Figure 3:
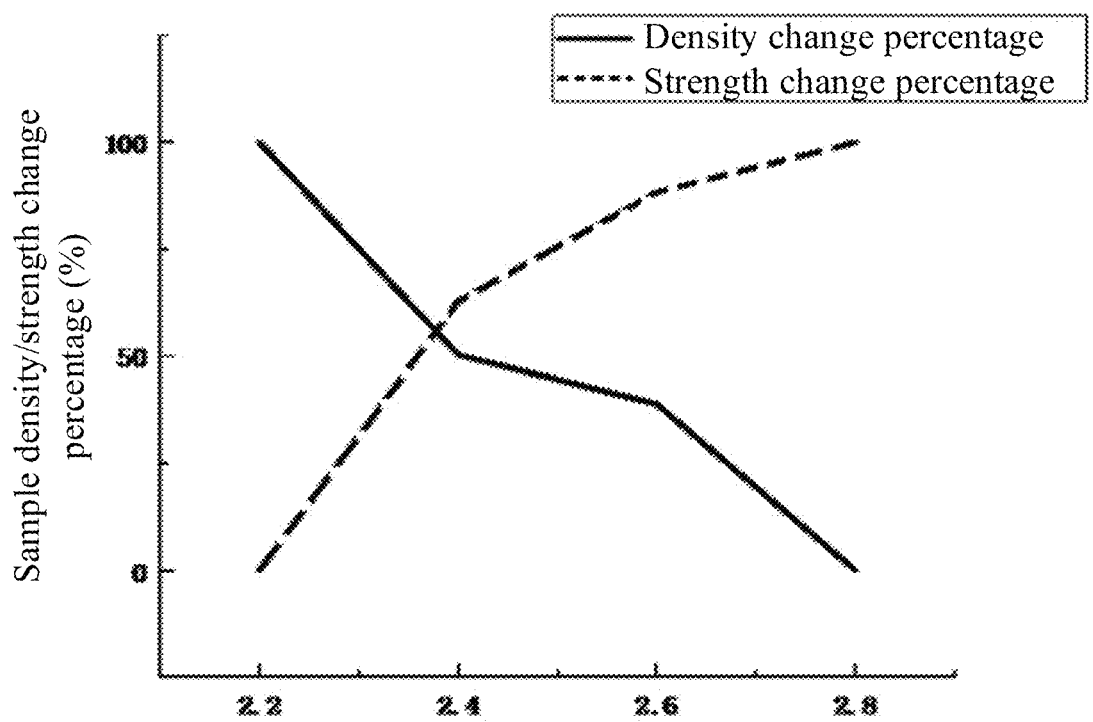
FIG. 3 is an optimization diagram of a water-to-cement ratio in a preparation process of a foamed cement slurry in a specific example.
Figure 4:
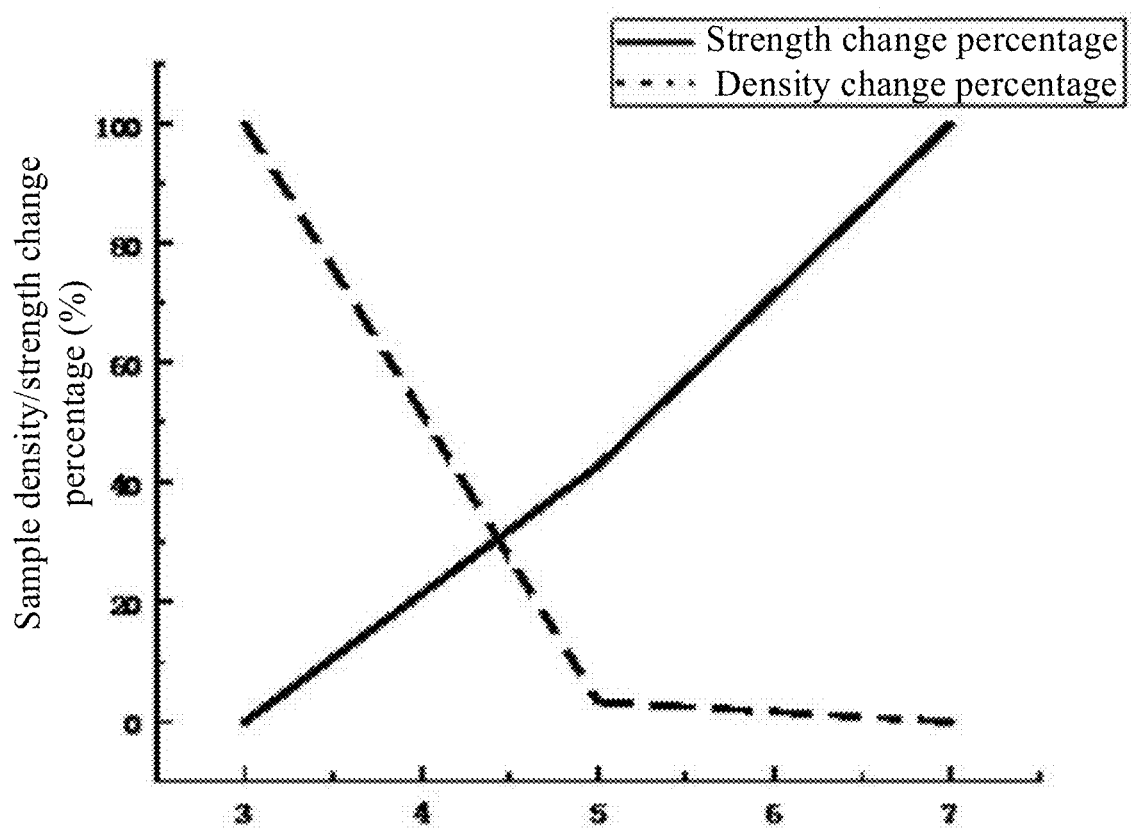
FIG. 4 is an optimization diagram of a foam-to-slurry ratio in a preparation process of a foamed cement slurry in a specific example.

The foam-to-slurry ratio corresponding to an intersection point of two polylines is about 4.5:1, and the water-to-cement ratio is 1:2.4, in which case, the concretion strength of the $CO_2$ foamed cement slurry is not low and the concretion density can be controlled. When the foam-to-slurry ratio is higher than 4.5:1 and the water-to-cement ratio is higher than 1:2.4, the concretion strength is relatively low; and when the foam-to-slurry ratio is lower than 4.5:1 and the water-to-cement ratio is lower than 1:2.4, the concretion density is relatively high. Therefore, the foam-to-slurry ratio of 4.5:1 and the water-to-cement ratio of 1:2.4 are adopted, such that the density and strength are both excellent, as shown in FIG. 3 and FIG. 4.

Figure 5:
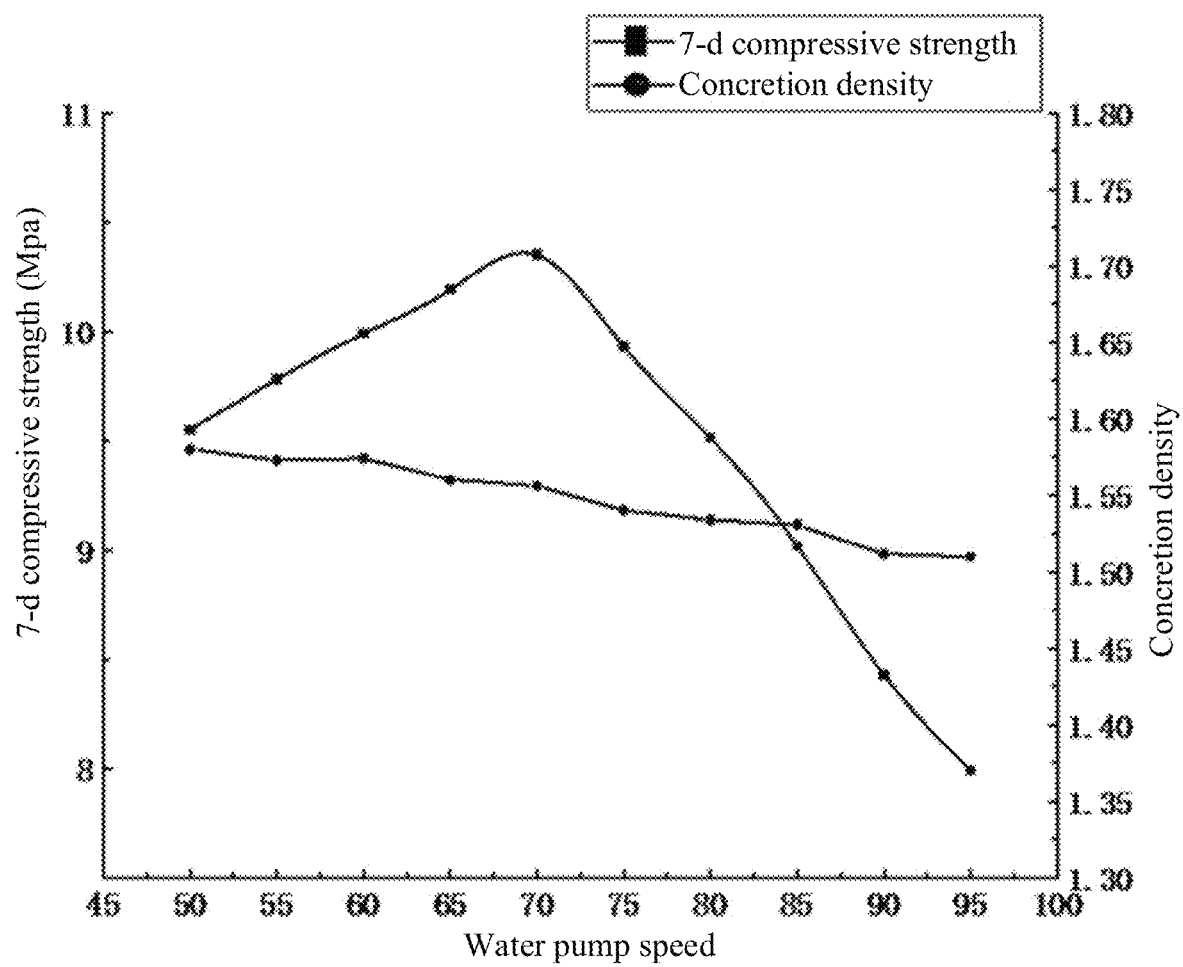
FIG. 5 is a schematic diagram illustrating the change of 7-day strength and density of a concretion with a speed of the water pump in a specific example.

Step S6: A contrast experiment of different water pump speeds is conducted on the slurries obtained in step S5, the prepared slurries are subjected to slurry performance tests (specific gravity, flowability, consistency, water excretion rate, concretion volume shrinkage, concretion density, and 7 d and 28 d UCSs), and optimization is completed according to slurry performance requirements. An adjustable range of the water pump speed parameter of the foaming machine is [50~95], and the range is evenly divided to obtain 10 parameter points 50, 55, 60, 65, 70, 75, 80, 85, 90, and 95 (r/s) for comparative experiments. A foamed cement slurry is prepared with the prepared water-based foam according to a foam-to-slurry ratio of 4.5:1 and a water-to-cement ratio of 1:2.4. The specific gravity and compressive strength performance of the lightweight cement slurry at different water pump speeds are compared and shown in FIG. 5, and 70 r/s is adopted as the optimal water pump speed parameter. At this speed, the cement slurry shows high strength and relatively-low density.

Results show that the preparation parameters for $CO_2$ foamed cement slurry with the optimal performance are as follows:

| | |
|---|---|
| Foaming agent type and concentration | Teasaponin (4 g/L) |
| Foam stabilizer type and concentration | SDBS (5 g/L) |
| Initial water-to-cement ratio | 1:2.4 |
| Foam-to-slurry ratio | 4.5:1 |
| Water pump speed | 70 r/s |

A non-air-entrained cement slurry and the $CO_2$ foamed cement slurry with the same water-to-cement ratio are compared, and results are shown in the table below:

| Performance parameter | | Non-air-entrained cement slurry | $CO_2$ foamed cement slurry |
|---|---|---|---|
| Specific gravity | | 1.699 | 1.442 |
| Water separation rate | | 22/200 | 15/200 |
| Concretion rate | | 0.988 | 0.830 |
| Concretion density | | 1.769 | 1.558 |
| Flexural strength | (7 d) | 2.98 | 3.05 |
| | (28 d) | 4.06 | 4.08 |
| Compressive strength | (7 d) | 8.900 | 11.056 |
| | (28 d) | 14.865 | 16.476 |

Compared with the non-air-entrained cement slurry, the $CO_2$ foamed cement slurry has high strength, and low density and specific gravity.

Example 2

This example is different from Example 1 only in that step S3 in Example 1 is conducted, in which the slurry prepared in the laboratory is replaced with a slurry prepared on the construction site.

Steps for preparing the slurry on the construction site are as follows.

A cement slurry is prepared and then continuously stirred in a mixing tank, a foaming liquid of an appropriate concentration is pipetted by a foaming machine and added to a foaming tank for full foaming, the mixing tank and the foaming tank are connected through a valve and a long transmission pipeline, and the valve is opened to allow the water-based foam and the cement slurry to be mixed in the transmission pipeline and pumped to a designated location.

The present invention provides an optimized preparation method of a carbonization-based lightweight $CO_2$ foamed cement-based material, such that those skilled in the art can realize or use the present invention. Various modifications to these examples are readily apparent to a person skilled in the art, and the generic principles defined herein may be practiced in other examples without departing from the spirit or scope of the present invention. Thus, the present invention is not limited to the examples shown herein but falls within the widest scope consistent with the principles and novel features disclosed herein.

What is claimed is:

1. A carbonization-based lightweight $CO_2$ foamed cement-based material, comprising the following components: a teasaponin foaming agent with a concentration of 4 g/L, a sodium dodecylbenzenesulfonate foam stabilizer with a concentration of 5 g/L, a water-based carbon dioxide foam, and a cement slurry, wherein a foam-to-slurry volume ratio of the water-based carbon dioxide foam to the cement slurry is 4.5:1; a water-to-cement mass ratio of the cement slurry is 1:2.4; and a speed of a water pump to produce the water-based carbon dioxide foam is 70 r/s.

2. An optimized preparation method of a carbonization-based lightweight $CO_2$ foamed cement-based material, comprising the following steps:
step S1: investigating existing foaming agents and foam stabilizers for lightweight cement slurries, and selecting $n_1$ foaming agents and $n_1$ foam stabilizers that are commonly used;
step S2: using a water-based carbon dioxide foam foaming machine to conduct a pre-experiment on the $n_1$ foaming agents and the $n_1$ foam stabilizers in step S1, and selecting $n_2$ foaming agents and $n_2$ foam stabilizers according to a water-based foam stabilization time and a foaming height to prepare water-based carbon dioxide foams, wherein $n_2 < n_1$;
step S3: preparing a cement slurry with a predetermined initial water-to-cement ratio, and mixing a water-based carbon dioxide foam with the cement slurry in a predetermined foam-to-slurry ratio to prepare a lightweight $CO_2$ foamed cement slurry;
step S4: conducting an experimental design based on the $n_2$ foaming agents and the $n_2$ foam stabilizers in step S2: using foaming agents of different types of the $n_2$ foaming agents and different concentrations, and foam stabilizers of different types of the $n_2$ foam stabilizers and different concentrations to prepare lightweight $CO_2$ foamed cement slurries according to step S3, and subjecting the prepared lightweight $CO_2$ foamed cement slurries to slurry performance tests, wherein slurry performance comprises a specific gravity, a flowability, a consistency, a water excretion rate, a concretion volume shrinkage, a concretion density, and 7 day and 28 day uniaxial compressive strengths; and optimizing the type and concentration of foaming agent, and the type and concentration of foam stabilizer based on slurry performance requirements, wherein a process of the optimizing is conducted by an orthogonal experiment: setting a concentration range of conventional foaming agents as $[w_1\text{-}w_2]$, and evenly dividing the concentration range to obtain $n_2$ parameter points $w_1, A_1, A_2 \ldots A_{n2\text{-}2}$, and $w_2$; setting a concentration range of foam stabilizers as $[w_3\text{-}w_4]$, and evenly dividing the concentration range to obtain $n_2$ parameter points $w_3, B_1, B_2 \ldots B_{n2\text{-}2}$, and $w_4$; and in conjunction with the $n_2$ foaming agents and the $n_2$ foam stabilizers selected in step S2, conducting a four-factor $n_2$ level orthogonal experiment on the type and concentration of the foaming agent, and the type and concentration of the foam stabilizer, and using a range analysis to obtain an optimization result of the experiment, the experiment mainly comprises two steps of calculation and determination, wherein the calculation is performed by: selecting the following four performance indexes of the lightweight $CO_2$ foamed cement slurries for the range analysis: 7-day compressive strength, density, concretion rate, and foam stabilization time;

assuming that A, B . . . represent different factors; r represents a number of levels of each factor; $A_i$ represents an ith level of factor A, wherein i=1, 2, . . . , r; and $X_{ij}$ represents a value of an ith level of factor j, wherein i=1, 2, . . . , r, and j=A, B . . . ; conducting n tests under $X_{ij}$ to obtain n test results which are $Y_{ij}$, wherein calculation parameters are as follows:

$$K_{ij} = \sum_{k=1}^{n} Y_{ijk}$$

wherein $K_{ij}$ represents a statistical parameter of the factor j at the ith level; n represents a number of tests of the factor j at the ith level; $Y_{ij}$ represents an index value of the kth test result of the factor j at the ith level, wherein k=1, 2, . . . , r;

$$R_j = \frac{\max\{K_{1j}, K_{2j}, \ldots K_{rj}\} - \min\{K_{1j}, K_{2j}, \ldots K_{rj}\}}{m}$$

wherein $R_j$ represents a range of the factor j, and m represents a number of levels of an experimental factor; based on comprehensive consideration of range results of the 7-day compressive strength, the density, the concretion rate, and the foam stabilization time of the slurries, determining the optimal type and concentration of the foaming agent, and the optimal type and concentration of the foam stabilizer;

step S5: based on the optimal type and concentration of the foaming agent, and the optimal type and concentration of the foam stabilizer in step S4, designing different initial water-to-cement ratios and foam-to-slurry ratios to prepare slurries, subjecting the prepared slurries to slurry performance tests, and optimizing the initial water-to-cement ratio and foam-to-slurry ratio parameters based on slurry performance requirements; and step S6: conducting different gas-filling volume tests on the slurries obtained in step S5, subjecting the slurries to slurry performance tests, and optimizing an air-filling volume based on slurry performance requirements.

3. The method according to claim 2, wherein a carbonization process of $CO_2$ with the cement slurry is as follows:

$CO_2 + H_2O \rightarrow H_2CO_3$ $Ca(OH)_2 + H_2CO_3 \rightarrow CaCO_3$ $3CaO_2SiO_23H_2O + 3H_2CO_3 \rightarrow 3CaCO_3 + 2SiO_2 + 6H_2O$ $2CaOSiO_24H_2O + 2H_2CO_3 \rightarrow 2CaCO_3 + SiO_2 + 6H_2O.$ 4. The method according to claim 2, wherein the water-based carbon dioxide foam foaming machine comprises a carbon dioxide cylinder (1), a primary pressure-reducing valve (2), a secondary pressure-reducing valve (9), a gas storage pipe (3), a liquid storage pipe (5), a foaming pipe (6), a foaming liquid (7), a foam-discharging pipe (8), and a controller (4), wherein the carbon dioxide cylinder (1) is arranged with the primary pressure-reducing valve (2), and the primary pressure-reducing valve (2) is connected to the secondary pressure-reducing valve (9) through the gas storage pipe (3); the secondary pressure-reducing valve (9) is connected to one end of the foaming pipe (6), and the liquid storage pipe (5) is connected to the other end of the foaming pipe (6); the foaming liquid (7) is stored in the liquid storage pipe (5), and the foam-discharging pipe (8) extends from a bottom end of the foaming pipe (6); and a specific foaming process comprises: preparing the foaming liquid (7) in advance, and turning on the water pump to make the foaming liquid (7) enter the foaming pipe (6) from the liquid storage pipe (5); turning on a switch of the carbon dioxide cylinder (1), and adjusting the primary pressure-reducing valve (2) connected to the carbon dioxide cylinder (1) to make an output gas pressure not higher than 0.5 MPa; adjusting the secondary pressure-reducing valve (9) in the foaming machine to accurately control a foaming pressure at no more than 0.02 MPa, such that carbon dioxide flows into the foaming pipe (6) through the gas storage pipe (3) and is mixed with the foaming liquid (7); and turning off the water pump, clicking a foaming button, and responding by the controller (4) to make the foaming liquid (7) flow from the foaming pipe (6) into a foam blowing port through a restrictor, such that a prepared carbon dioxide foam flows out through a foam-discharging port connected to the foam-discharging pipe (8).

5. The method according to claim 2, wherein in the step S2, foaming liquids of the same volume are pre-prepared according to an experimental ratio for full foaming, and a volume of a water-based carbon dioxide foam formed after a premix is completely foamed is recorded as a foaming volume of a corresponding foaming liquid; a ratio of a foam volume to a premix volume is defined as a foaming ratio expressed by Au, and a larger Au indicates a stronger foaming ability of the foaming liquid; a time required when a foam volume is dissipated to half of an original volume is defined as a half-life period of a corresponding foaming agent, expressed by Tu; and a larger Tu indicates a better stability of the water-based foam, and a smaller Tu indicates a worse stability of the water-based foam.

6. The method according to claim 2, wherein in the step S5, a comprehensive experiment is adopted in the optimization process of initial water-to-cement ratio and foam-to-slurry ratio parameters, an initial water-to-cement ratio parameter range of the conventional cement slurry is $[w_5\text{-}w_6]$, and the initial water-to-cement ratio parameter range is evenly divided to obtain $n_3$ parameter points $w_5$, $C_1$, $C_2 \ldots C_{n3\text{-}2}$, and $w_6$; a foam-to-slurry ratio parameter range is $[w_7\text{-}w_8]$, and the foam-to-slurry ratio parameter range is evenly divided to obtain $n_4$ parameter points $w_7$, $D_1$, $D_2 \ldots D_{n4\text{-}2}$, and $w_8$; and a comprehensive experiment on the initial water-to-cement ratios and foam-to-slurry ratios is conducted.

7. The method according to claim 6, wherein an influence of different water-to-cement ratios on strength and density of a cement slurry is subjected to comprehensive analysis under a same foam-to-slurry ratio to obtain a balanced water-to-cement ratio, that is, under the balanced water-to-cement ratio, the density of the cement slurry is relatively low and the strength is relatively high; and the comprehensive analysis is performed by setting maximum and minimum reduction percentages of each of the density and the strength respectively as 0% and 100%, plotting two polylines according to the reduction percentages, and defining a water-to-cement ratio corresponding to an intersection point of the two polylines as the balanced initial water-to-cement ratio.

8. The method according to claim 2, wherein in the step S6, a contrast experiment is adopted in the gas-filling volume optimization process, a gas-filling volume parameter range of the conventional lightweight cement slurry is

[$w_9$-$w_{10}$], and the gas-filling volume parameter range is evenly divided to obtain $n_5$ parameter points $w_9$, $E_1$, $E_2$, ..., $E_{n5\text{-}2}$, and $w_{10}$; and a contrast experiment on the gas-filling volume is conducted, specific gravity and compressive strength properties of the lightweight cement slurry under different gas-filling volumes are compared, and the optimal gas-filling volume parameter is selected.

* * * * *